(12) United States Patent
Schumann

(10) Patent No.: US 9,091,482 B2
(45) Date of Patent: Jul. 28, 2015

(54) METHOD AND SUBSTRATE FOR CURING A HONEYCOMB STRUCTURE

(75) Inventor: Matthias Schumann, Plan d'Orgon (FR)

(73) Assignee: SAINT-GOBAIN CENTRE DE RECHERCHES ET D'ETUDES EUROPEEN, Courbevoie (FR)

( * ) Notice: Subject to any disclaimer, the term of this patent is extended or adjusted under 35 U.S.C. 154(b) by 955 days.

(21) Appl. No.: 13/258,486

(22) PCT Filed: Mar. 22, 2010

(86) PCT No.: PCT/FR2010/050504
§ 371 (c)(1),
(2), (4) Date: Sep. 22, 2011

(87) PCT Pub. No.: WO2010/109120
PCT Pub. Date: Sep. 30, 2010

(65) Prior Publication Data
US 2012/0013052 A1    Jan. 19, 2012

(30) Foreign Application Priority Data

Mar. 24, 2009 (FR) ...................... 09 51871

(51) Int. Cl.
*C04B 35/64* (2006.01)
*F27D 5/00* (2006.01)
(Continued)

(52) U.S. Cl.
CPC . *F27D 5/00* (2013.01); *C04B 35/10* (2013.01); *C04B 35/185* (2013.01);
(Continued)

(58) Field of Classification Search
CPC .............................. F27D 5/00; C04B 38/0006
USPC .................................................. 264/630, 631
See application file for complete search history.

(56) References Cited

U.S. PATENT DOCUMENTS

| 4,786,542 A | 11/1988 | Yasuda et al. | |
| 2008/0116621 A1* | 5/2008 | Brennan et al. | 264/606 |

(Continued)

FOREIGN PATENT DOCUMENTS

| DE | 33 37 875 | 4/1985 |
| EP | 0 234 887 | 9/1987 |

(Continued)

OTHER PUBLICATIONS

International Search Report issued Jul. 8, 2010 in PCT/FR10/050504 filed Mar. 22, 2010.

*Primary Examiner* — Erin Snelting
(74) *Attorney, Agent, or Firm* — Oblon, McClelland, Maier & Neustadt, L.L.P.

(57) ABSTRACT

The invention relates to a process for firing a porous ceramic structure of the honeycomb type on a firing setter, said structure comprising a plurality of longitudinal through-channels terminating in two ends of the structure, the end bearing on the setter having a maximum width $L_S$ before firing, in a longitudinal sectional plane passing through the principal axis of the structure, said process being characterized in that the setter has, in said longitudinal sectional plane: a first level corresponding to a first face of the setter serving as bearing surface for the structure to be fired, said level having a maximum width $L_1$; a second level, spaced away from said first face of the setter by a thickness $E_{1-2}$, said second level having a maximum width $L_2$; the width $L_1$ being equal to or greater than $L_S$; and the width $L_2$ being less than $L_1$, and also to the setter as described above.

15 Claims, 7 Drawing Sheets

(51) Int. Cl.
*C04B 35/10* (2006.01)
*C04B 35/185* (2006.01)
*C04B 35/195* (2006.01)
*C04B 35/478* (2006.01)
*C04B 35/565* (2006.01)
*C04B 35/626* (2006.01)

(52) U.S. Cl.
CPC ............ *C04B 35/195* (2013.01); *C04B 35/478* (2013.01); *C04B 35/565* (2013.01); *C04B 35/6262* (2013.01); *C04B 35/62665* (2013.01); *C04B 35/64* (2013.01); *C04B 2235/3206* (2013.01); *C04B 2235/3217* (2013.01); *C04B 2235/3234* (2013.01); *C04B 2235/3244* (2013.01); *C04B 2235/3418* (2013.01); *C04B 2235/5427* (2013.01); *C04B 2235/5436* (2013.01); *C04B 2235/5472* (2013.01); *C04B 2235/606* (2013.01); *C04B 2235/72* (2013.01); *C04B 2235/80* (2013.01); *C04B 2235/9615* (2013.01); *C04B 2235/9623* (2013.01)

(56) References Cited

U.S. PATENT DOCUMENTS

| 2008/0142149 | A1 | 6/2008 | Noguchi et al. | |
| 2009/0079111 | A1* | 3/2009 | Kasai et al. | 264/489 |
| 2009/0243165 | A1* | 10/2009 | Hiroshima | 264/630 |
| 2011/0127699 | A1* | 6/2011 | Vayansky et al. | 264/630 |

FOREIGN PATENT DOCUMENTS

| EP | 1 808 423 | 7/2007 |
| JP | 2003 082403 | 3/2003 |

* cited by examiner

METHOD AND SUBSTRATE FOR CURING A HONEYCOMB STRUCTURE

The invention relates to a firing setter, for firing honeycomb structures, and to the process for obtaining said setter. Such structures may be filter structures and/or catalytic structures and are used especially in an exhaust line of an internal combustion engine of the diesel type. The invention relates more particularly to firing setters for filter structures or for catalyst supports based on oxide ceramics, and especially for filters based on aluminum titanate, and also to the process for obtaining said setters.

To give an example, catalytic filters for the treatment of exhaust gases and for the removal of soot coming from a diesel engine are well known in the prior art. These structures usually all have a honeycomb shape, one of the faces of the structure allowing the intake of exhaust gases to be treated and the other face allowing the discharge of the treated exhaust gases. The structure comprises, between the intake and discharge faces, an array of adjacent ducts or channels of mutually parallel axes separated by porous walls. The ducts are sealed off at one or the other of their ends in order to define inlet chambers that open onto the intake face and outlet chambers opening onto the discharge face. The channels are alternately sealed off in an order such that the exhaust gases, as they pass through the honeycomb body, are constrained to pass through the side walls of the inlet channels in order to rejoin the outlet channels. In this way, the particulates or soot particles are deposited and accumulate on the porous walls of the filtering body.

As is known, during its use a particulate filter is subjected to a succession of filtration (soot accumulation) and regeneration (soot removal) phases. During the filtration phases, the soot particles emitted by the engine are retained and deposited inside the filter. During the regeneration phases, the soot particles are burnt off inside the filter, so as to restore the filtration properties thereof.

So as in particular to increase the storage volume of particulates or soot particles, and the storage volume of the residues resulting from the combustion of these soot particles and thus increase the time between two regenerations, various filter structures have already been proposed in the prior art. In particular, structures called hereafter "asymmetric" structures have, for a constant filter volume, an inlet channel surface or volume which is different from that of the outlet channels of said filter. For example, patent application WO 05/016491 has proposed structures in which the wall elements come one after another, in cross section and along a horizontal and/or vertical row of channels, in order to define a sinusoidal or wavy shape. Typically, the wall elements form a wave with a sinusoid half-period over the width of a channel. Such channel configurations make it possible to achieve a low pressure drop and a high soot storage volume. In another construction, patent application EP 1 495 791 has proposed monolith blocks characterized by an octagonal arrangement of the internal inlet channels (often called an "octosquare" structure in the field).

Usually, the filters are made of a porous ceramic, for example cordierite or silicon carbide or aluminum titanate.

Silicon carbide filters produced with these structures are for example described in patent applications EP 816 065, EP 1 142 619, EP 1 455 923, WO 2004/090294 and WO 2004/065088, to which a person skilled in the art may for example refer for greater explanation and details, both as regards the description of filters according to the present invention and as regards the process for obtaining them. Advantageously, these filters possess high chemical inertness to the soot particles and to the hot gases, but a thermal expansion coefficient that is a little high, which means, for producing large-sized filters, having to assemble several monoliths into a filtering block by a jointing or grouting cement, so as to reduce their thermomechanical stresses. Because of the high mechanical strength of recrystallized SiC materials, it is possible to produce filters with thin filtering walls of high porosity, with a very satisfactory filtration efficiency.

Cordierite filters have also been used for a long time because of their low cost. Thanks to the very low thermal expansion coefficient of this material, in the normal operating temperature range of a filter, it is possible to produce monolithic filters of larger size.

Aluminum titanate may also have a low thermal expansion coefficient and exhibits both better refractoriness and better corrosion resistance than cordierite. Thus, aluminium titanate enables large monolithic filters to be produced, provided that, however, the thermal stability of the aluminum titanate is controlled, especially during the filter regeneration phases. Monolithic filters have thus been described in patent application WO 2004/011124 that provides structures based on 60 to 90% by weight of aluminum titanate reinforced with 10 to 40% by weight of mullite. According to the authors, the filter thus obtained is more durable. In another construction, patent application EP 1 741 684 discloses a filter having a low expansion coefficient and in which the aluminum titanate main phase is stabilized, on the one hand, by substituting a fraction of the Al atoms with Mg atoms in the $Al_2TiO_5$ crystal lattice within a solid solution and, on the other hand, by substituting a fraction of the Al atoms on the surface of said solid solution with Si atoms, these being introduced into the structure via an intergranular additional phase of the potassium sodium aluminosilicate type, especially of the feldspar type.

Typically, these monolithic structures are extruded and then, in the case of a filter structure, sealed off at one or other of their ends so as to define inlet chambers and outlet chambers, as described above. These structures are fired so that the material constituting the structure is mechanically sintered or consolidated. It turns out that, during the firing phase, the structure undergoes what is called an "elephant foot" deformation illustrated schematically in FIG. 1. FIG. 1 shows that the base 1 of the structure 2 close to the face 3 for bearing on the firing setter 4 (lower portion) has a larger width than in the upper portion of the structure. Typically, a dimensional difference greater than 1% over the width of the filter, for a 100 mm length of said filter, is considered as being unacceptable for the application. The deformation is more pronounced when the extruded structure 2 is of large size. The expression "large size" is understood in particular to mean structures with a diameter greater than 100 mm or with a cross section greater than 75 $cm^2$. The problem even becomes critical for structures of very great length, for example a length greater than 150 mm, and/or of very large diameter, for example a diameter greater than 125 mm, or of large cross section, i.e. equal to or greater than 120 $cm^2$. Likewise, obtaining such a structure poses problems if the post-firing shrinkage of the structure, along its largest dimension, is equal to or greater than 5%. The term "shrinkage" is understood in the context of the present description to mean the difference, expressed as a percentage, between a characteristic dimension of the structure before firing and after firing, divided by said dimension before firing. Typically, in the case of an extruded structure of circular cross section, the shrinkage may be measured either on the length or on the diameter of said structure. The expression "structure before firing" is understood to mean the structure in the dry green state, i.e. having a residual moisture content of less than 1%.

In the context of the present description and in the following examples, the shrinkage is measured on a section of the filter approximately parallel to the plane formed by the bearing surface of the structure in contact with its firing setter but sufficiently far away from said bearing surface in order to circumvent the aforementioned "elephant foot" effect. In practice, the shrinkage is ideally measured over the upper third of the height of the structure.

To solve the problem of the "elephant foot" effect, one initial solution consists in extruding a green structure of greater length than necessary. The most deformed part of the structure at its base, i.e. that located in the portion in the vicinity of its face for bearing on the firing setter, is therefore cut off after the firing. Finally, the structure is plugged and then optionally annealed so as to sinter the material constituting the plugs. This solution entails a substantial loss of material since the cuttings may represent more than 15% of the total mass of the structure. Furthermore, the plugging operation on a fired structure is tricky since the plugs are of insufficient refractoriness or impermeability if the plugged structure is not annealed. A second firing, to fire the plugs and obtain a filter structure of sufficient filtration efficiency, represents an additional operation and an additional cost, something which cannot be economically envisaged.

Patent application EP 0 234 887 provides a firing setter formed by a fired or green honeycomb having, on its face in contact with the structure to be fired, at least a width smaller than the width of said structure to be fired. For example, this firing setter may have a bevel or various recess shapes. This solution, which has the advantage of providing the part with good stability, also results in an undesirable vertical deformation of the structure to be fired, especially when the shrinkage of the part is greater than 5%. The structure obtained after firing then has in the end a greater length along the edges, therefore requiring the structure to undergo an additional machining operation and an additional plugging operation after firing.

Patent application EP 1 808 423 describes a green setter that forms a crystalline phase of the same nature as the structure during firing and has a surface roughness of 8 to 50 µm so as to reduce the friction between the firing setter and the structure. Although this solution is suitable for eliminating the occurrence of fractures or large cracks in the fired structure, it does not solve the problem of elephant-foot deformation described above and illustrated by FIG. 1 appended hereto.

The present invention relates according to a first aspect to a process for firing a honeycomb structure, possibly a filter structure, using a firing setter of novel type, which makes it possible for all of the abovementioned requirements to be effectively satisfied, in particular:
the quality of the filters is improved, in particular by avoiding the appearance of cracks and/or deformations of the structure during firing, so as to obtain a filter structure of satisfactory filtration efficiency;
the structure to be fired on its setter and the setter itself are sufficiently stable; and
binder removal and firing (or sintering) are more rapid without the risk of degrading the quality of the structures obtained, so as to obtain a high productivity.

FIG. 1 schematically shows an "elephant foot" deformation of a prior art structure when fired.

Figure 1:
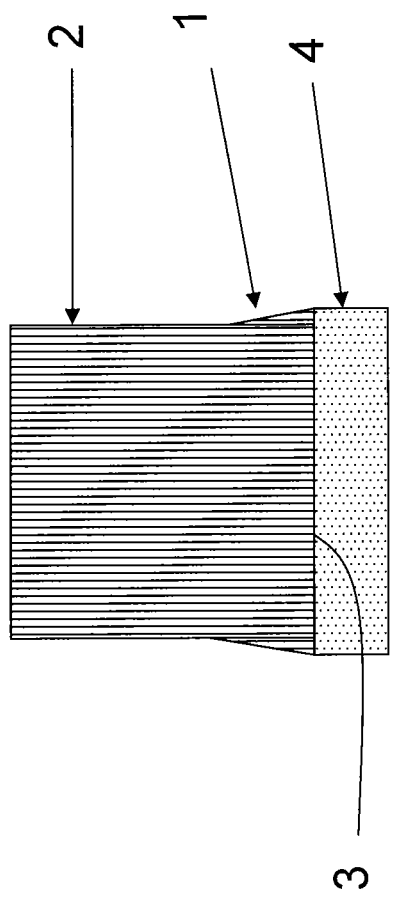

In its most general form and according to a first aspect, the present invention relates to a process for firing a porous ceramic structure of the honeycomb type on a firing setter, said structure comprising a plurality of longitudinal through-channels terminating in two ends of the structure, the end bearing on the setter having a maximum width $L_S$ before firing, in a longitudinal sectional plane passing through the principal axis of the structure. In the process according to the invention, said setter has, in said longitudinal sectional plane:
a first level corresponding to a first face of the setter serving as bearing surface for the structure to be fired, said first level having a maximum width $L_1$;
a second level, spaced away from said first face of the setter by a thickness $E_{1-2}$, said second level having a maximum width $L_2$;
the width $L_1$ being equal to or greater than $L_S$; and
the width $L_2$ being less than $L_1$.

The principal axis of the honeycomb structure is conventionally defined according to the invention as the principal axis of symmetry of the structure, parallel to the through-channels. Said axis is of course defined according to the shape of the structure and in particular its cross section. To give an example, it is the axis of revolution in the case of a cylindrical structure or the central axis of a parallelepipedal or ovoid structure. In particular, the principal axis is shown in the schematic views in FIGS. 3 and 6. Thus, for a honeycomb structure having a cross section of given shape at its lower end (i.e. on its bearing face), for example an oval, round or square cross section, the setter used according to the invention preferably has a generally similar overall shape, i.e. a substantially oval, round or square shape respectively, in particular the dimensions of which are such that $L_1$ is between $L_S$ and $1.1 \times L_S$ in any longitudinal plane passing through the principal axis of the structure to be fired.

Particular methods of implementing such a process are especially described below:
the width $L_1$ is between $L_S$ and $1.1 \times L_S$;
the relative difference $(L_1-L_2)/L_1$ between the two widths $L_1$ and $L_2$ is equal to or greater than about 5%;
the end of the structure and that face of the setter serving as bearing face thereof have substantially the same shape and/or substantially the same geometry;
the setter is of the honeycomb type and comprises a plurality of longitudinal through-channels opening onto two ends, the upper end of the setter constituting said first level;
the setter has a porosity matched to the porosity of the material constituting the walls of the filter. The setter has in general between 20 and 65%, preferably between 30 and 50%, the average size of the pores being ideally between 10 and 20 microns. However, too high a porosity results in a mechanical strength that is too low to support the filter. Too low a porosity may be damaging for the filter since the shrinkage of the setter may not accompany the shrinkage of the filter sufficiently during its firing;
the wall thickness of the honeycomb setter is advantageously between 0.2 and 1.0 mm, preferably between 0.2 and 0.5 mm. The number of channels in the filtering elements is preferably between 7.75 and 62 per cm², said channels having a cross section ranging from about 0.5 mm² to 9 mm²;

the first level corresponding to a first face of the setter serving as support for the structure to be fired is a plane;

the third level corresponding to the second face at the base of the setter serving as support for the setter in the firing device (carriage or floor of the furnace for example) is preferably a plane, such a plane allowing better stability to be achieved;

the thermal expansion of the material constituting the setter varies by at most 2% of the thermal expansion of the material constituting the structure within the temperature range of the firing;

the shrinkage on firing the material constituting the setter varies by at most 2% of the shrinkage on firing the material constituting the structure within the temperature range of the firing;

the setter has a trapezoidal shape, said second level corresponding to the second face of the setter; and said setter has a third level corresponding to the second face of the setter, having a width $L_3$, the width $L_3$ being equal to or greater than the width $L_2$ and at least equal to ⅗ of the width $L_S$.

The firing process as described above may especially be used advantageously in a process for obtaining a honeycomb filter structure, in which the longitudinal through-channels of the structure are alternately blocked beforehand at their ends.

The invention also relates to the setter suitable for firing a porous ceramic structure of the honeycomb type, as described above, which setter in particular comprises, in a sectional plane passing through its principal axis:

a first level corresponding to a first face of the setter serving as bearing surface for the structure to be fired, said level having a maximum width $L_1$;

a second level, spaced away from said first face of the setter by a thickness $E_{1-2}$, said second level having a maximum width $L_2$;

the width $L_2$ being less than $L_1$.

According to other possible aspects of said setter:

the width $L_1$ is between $L_S$ and $1.1 \times L_S$;

the relative difference $(L_1-L_2)/L_1$ between the two widths $L_1$ and $L_2$ is equal to or greater than about 5%;

said firing setter, of the honeycomb type, comprises a plurality of longitudinal through-channels opening onto two ends, the upper end of the setter constituting said first level;

said setter has a trapezoidal shape, said second level corresponding to its second face; and said setter has a third level corresponding to its second face, having a maximum width $L_3$, the width $L_3$ being equal to or greater than the width $L_2$.

More precisely, the best results have been obtained according to the invention when the material constituting the setter is chosen so that its thermal expansion is close to that of the material constituting the structure to be fired. In the context of the present description, the thermal expansion measured at a temperature T corresponds to the percentage variation in length of a specimen of the material subjected to a temperature variation up to the temperature T (final temperature of the firing) relative to its initial length at the ambient temperature (20° C.) taken as reference. The thermal expansion is conventionally measured by differential dilatometry according to the NFB40-308 standard provided for this purpose. According to the present invention, the expansion of the specimen of material constituting the setter or the structure to be fired is measured in a plane parallel to the plane formed by the face 3 for bearing on the firing setter 4, as indicated above in FIG. 1. A thermal expansion of the setter in the firing temperature range is close to that of the structure within the context of the present invention if it is equal to that of the structure plus or minus 2%, and preferably plus or minus 1%, irrespective of the temperature in the range in question (20° C.-T).

Preferably, according to the invention, the setter is green so as to best accompany the dimensional variations of the structure while it is being fired. Advantageously, the material of the setter is chosen in such a way that its shrinkage after the heat treatment for firing the structure is equal to that of the structure plus or minus 2%, preferably plus or minus 1%.

The setter according to the invention may be used in various ways, some of which are illustrated below. Of course, the invention is not, in any of the aspects described, limited to these embodiments.

Figure 3:
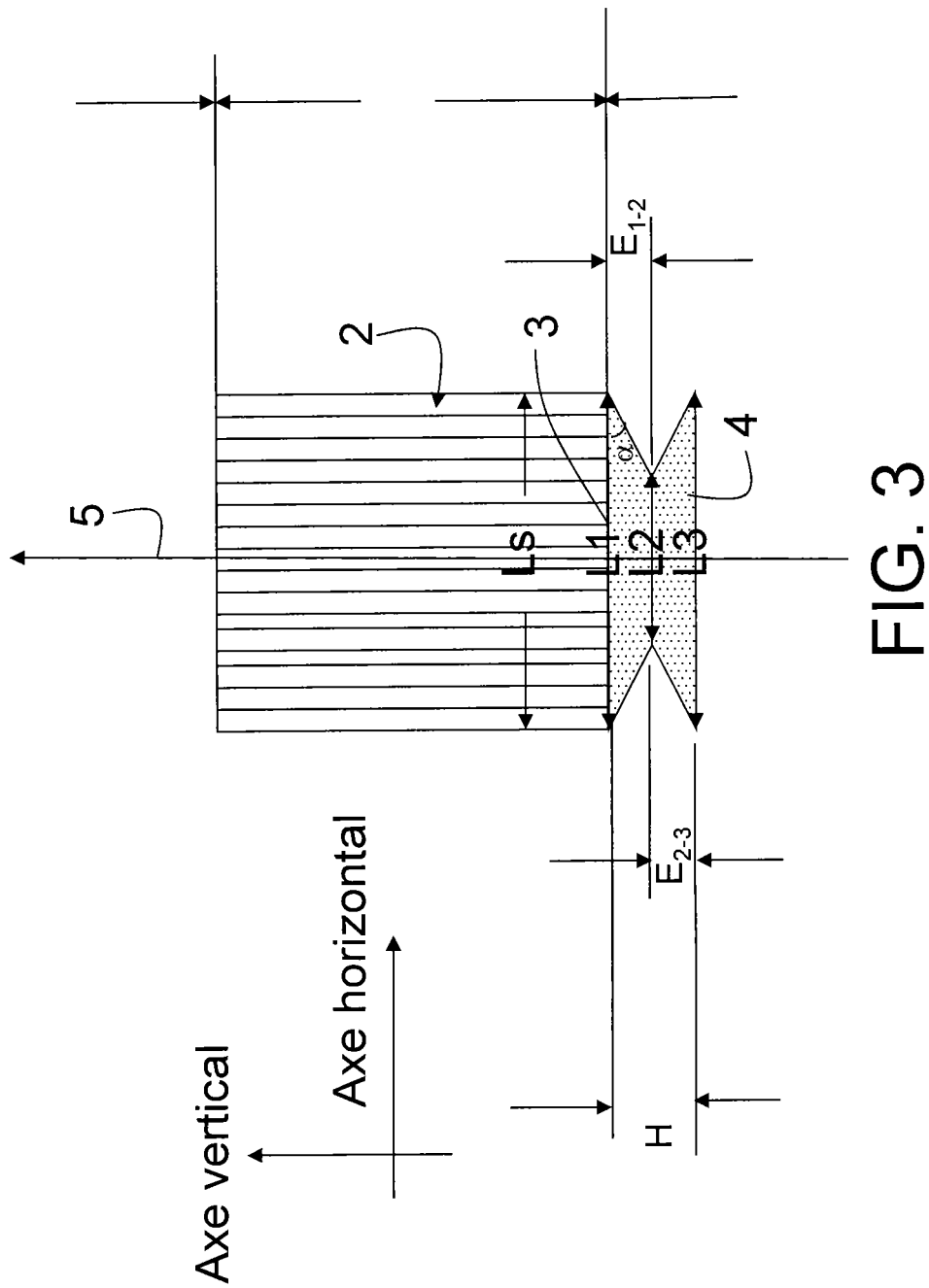
FIG. 3 shows a longitudinal sectional plane of a setter in a first configuration and the principal axis thereof

FIG. 3 illustrates a setter 4 in a first configuration according to the invention, in a longitudinal sectional plane of the structure, the principal axis 5 of which is shown. The setter according to the invention has a width $L_1$ between $L_S$ and $1.1 \times L_S$. For a structure having a bearing face of given shape, for example oval, round or square shape, the setter used according to the invention preferably has a generally similar shape i.e. an oval, round or square shape respectively, the dimensions of which are such that $L_1$ is between $L_S$ and $1.1 \times L_S$ in any longitudinal plane passing through the principal axis of the structure to be fired. Advantageously, such a configuration prevents vertical deformation of the structure, the vertical direction here being understood as the direction perpendicular to the plane formed by that surface of the structure to be fired that bears on the setter. According to the invention, the setter has a width $L_2$ smaller than $L_1$ so as to accompany the horizontal deformation of the structure while it is being fired. Preferably, the relative difference between the two widths $((L_1-L_2)/L_1)$ as a percentage is equal to or greater than about 5%, preferably equal to or greater than about 10%, and even more preferably equal to or greater than about 15%. In general, this difference however remains less than 50%, preferably less than 40% or even less than 30%.

The setter shown in FIG. 3 also has a width $L_3$ measured on a second face, or rest face, of the setter on the opposite side from the face 3 as indicated in FIG. 1, so as to ensure sufficient stability of the setter/structure assembly, this second face being in contact, during the firing process, with for example the floor of the firing furnace or the firing device.

The setter has a sufficient thickness $E_{1-2}$ between the level $L_1$ in contact with the structure to be fired and the level $L_2$ of the setter. The thickness $E_{1-2}$ and width $L_2$ values according to the invention depend on and vary according to the nature of the material constituting the setter, its internal geometry (especially depending on the presence of channels, on the wall thickness, etc.) and the envisaged heat treatment conditions (in particular the final temperature, the rate of temperature rise and the firing time at the maximum temperature).

Typically, the optimum thickness $E_{1-2}$ may be determined and adjusted experimentally.

To determine such an optimum thickness, various parameters will be considered, among which are the following:

the width $L_S$ of the structure to be fired, for example the outside diameter of the structure if this is of cylindrical cross section; and the height h or the length of the structure to be fired.

Preferably, the thickness $E_{1-2}$ and the width $L_2$ are adjusted experimentally, for example by successive iterations, so as to have optimum creep resistance or slump resistance under the load of the structure to be fired.

Preferably, $E_{1-2}$, $L_1$ and $L_2$ are chosen so that the angle α, as shown in FIG. 3, is greater than 15°, preferably greater than 45°.

Preferably, $E_{1-2}$, $L_1$ and $L_2$ are chosen so that the angle α is less than 85°.

Figure 4:
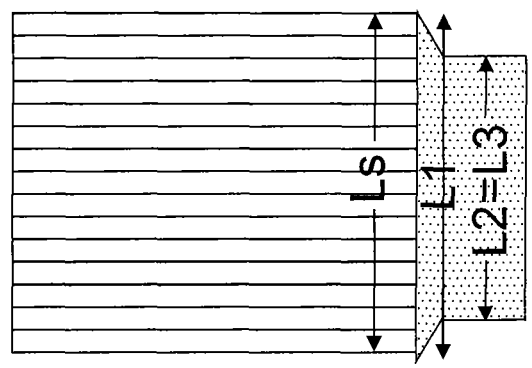
FIG. 4 shows another embodiment of the setter, wherein $L_2$ is substantially the same as $L_3$.

According to another embodiment illustrated in FIG. 4, the setter according to the invention has a configuration such that the parameters $L_2$ and $L_3$ described above are substantially identical, i.e. $L_2=L_3$.

According to this embodiment, the setter has a constant thickness $E_{2-3}$ between the level $L_2$ and the level $L_3$ at the base of the setter which is in contact with the floor of the furnace or with the firing device. According to one possible embodiment giving satisfactory results, $E_{2-3}$ is preferably less than $5L_5/3$.

Figure 5:
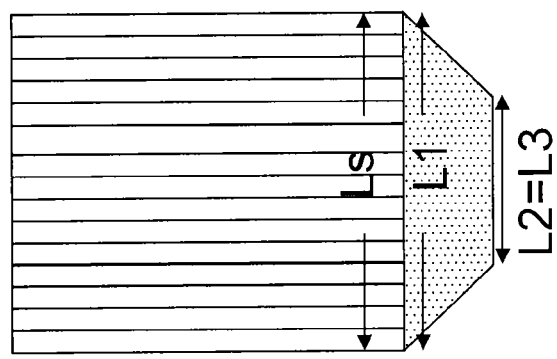
FIG. 5 shows a setter with a substantially trapezoidal shape.

In a preferred embodiment, illustrated in FIG. 5, the setter according to the invention is of substantially trapezoidal shape, corresponding to the extreme case in which $E_{2-3}=0$.

According to other possible embodiments (not illustrated by figures in the present description), the setter according to the invention may also have other shapes between the levels $L_2$ and $L_1$ provided that the distance $L_2$ remains less than the distance $L_1$, in particular it may have rounded perimeters or curves of concave or convex surface.

Figure 6:
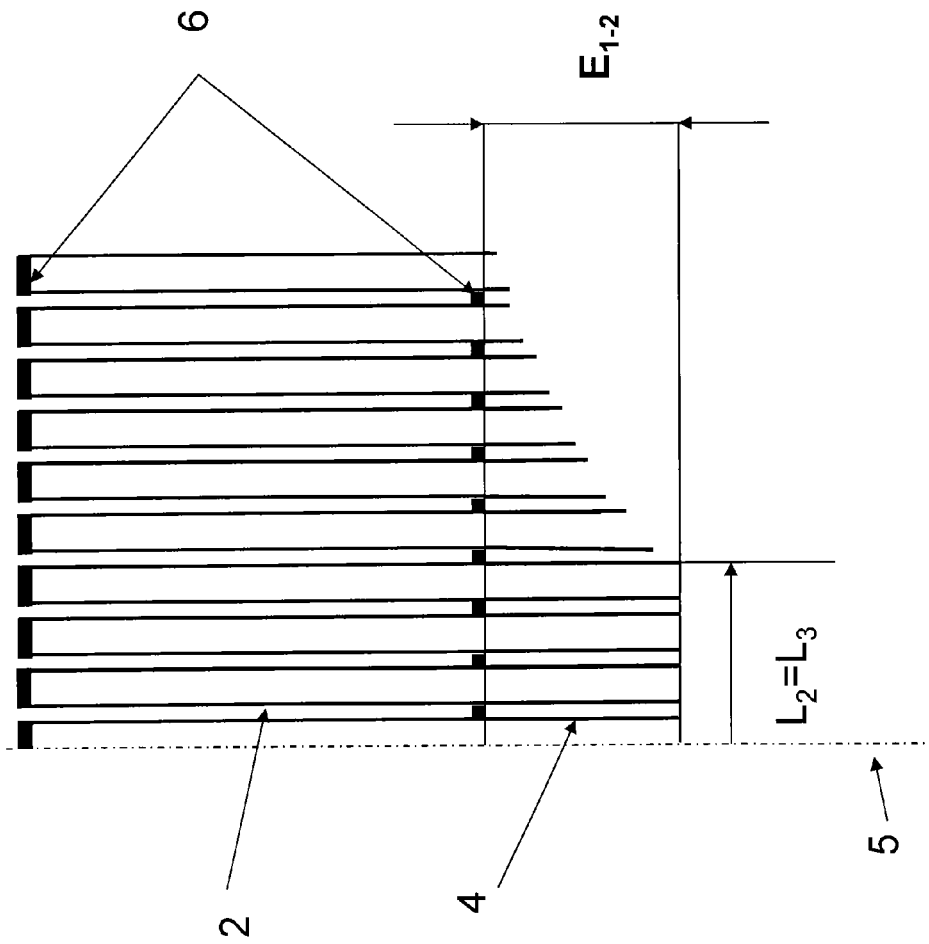
FIG. 6 shows a setter formed from channels.

The setter according to the invention may also advantageously have one or more of the following optional features:

a) the setter preferably has a suitable roughness, for example as described in the patent application EP 1 808 423, without this however being necessary for achieving the advantages of the setter according to the present invention. By depositing grains or a powder bed, for example of globular corundum or alumina, it may be possible to prevent any bonding to the setter while filling the surface irregularities of the setter;

b) the setter is green and its mineralogical chemical and particle-size composition is similar or even identical to that of the structure to be fired. Experiments carried out in the context of the present invention have shown that such a configuration does actually reduce the mechanical stresses on the structure during firing, especially if the shrinkage is high, in particular if the shrinkage is greater than about 7%. The expression "similar mineralogical composition" is understood to mean a composition having the same phases and/or a very close or even identical volume or mass distribution of the crystalline phases present after the structure has been fired;

c) the setter is porous. In particular, it preferably has an open porosity close to that of the structure to be fired. After firing, the porosity of the setter is typically between 10% and 80% and preferably between 30% and 70%. In particular in the particulate filter application, too low a porosity leads to too high a pressure drop, while too high a porosity corresponds to too low a mechanical strength. The median diameter $d_{50}$ by volume of the pores constituting the porosity of the setter after firing is preferably between 5 and 30 microns, more preferably between 8 and 25 microns; and d) the setter is itself formed from channels, as shown in FIG. 6, so as to let the gases emitted by or reacting with the structure to flow freely during binder removal and firing of said structure, said channels being oriented in the same direction during firing. In particular, the setter may have the same internal honeycomb macrostructure as the structure to be fired. Thus, when the structure 2 to be fired is of the honeycomb type, the setter 4 is preferably of the honeycomb type according to an arrangement as shown in FIG. 6 in which the plugs 6 closing off the channels have also been shown. The dimensional characteristics of the setter channels (channel density, wall thickness, channel shape in particular) are then preferably close to those of the structure to be fired, or even identical thereto. The setter may be adapted so that its channels have the same open surface area as those of the facing structure on the bearing face to be fired. Such an embodiment may be particularly advantageous for optimally firing structures of the "asymmetric" type, i.e. structures in which the surface of some of the inlet channels is different and preferably greater than that of some of the outlet channels, as illustrated by the aforementioned patent application WO 05/016491. Such an arrangement increases the rate at which the binders are removed at the start of the firing operation at the channels of the setter that are open to the outside. Such an arrangement is in the end favorable to good integrity of the filter structure and in particular it prevents the appearance of cracks or deformation of the structure during the firing.

One example of a process for manufacturing a honeycomb structure, in which a setter according to the invention may advantageously be used, typically comprises the following main steps:

a) preparation of a composition based on the constituent material of the structure and forming, especially by extrusion through a die, of said material and cutting so as to obtain a honeycomb structure;

b) preparation of a composition of a plugging material and sealing of said green structure in some of the channels by said composition before and/or after drying before and/ or after firing according to step d) so as to obtain a filter structure after firing;

c) optionally, drying in air using a technique chosen from hot-air drying, microwave drying and freeze drying at a temperature below 130° C., or a combination of said techniques; and d) firing of said structure on a setter according to the invention, optionally including an initial binder-removal step.

Typically, the firing step d) is carried out at a temperature dependent on the constituent material of the structure.

The inventors have observed that the setter according to the invention is particularly advantageous for the firing of green filter structures that have already been plugged, thereby making it possible to dispense with an additional firing step for sintering the plugs. Thus, the use of the setters according to the invention makes it easier in the end to obtain filter structures of improved cohesion between plugs and walls.

Preferably, the filter structure is monolithic and the filtering walls are based on an inorganic oxide material, in particular based on aluminum titanate or cordierite or mullite, or a composite based on these materials. The expression "based on" is understood to mean that said walls comprise at least 50% by weight, preferably at least 70% by weight, or at least 90% by weight or even 98% by weight of said material.

In a first possible embodiment according to the invention, the porous walls of the filter structure are made of a material based on aluminum titanate. In general, the composition of the aluminum-titanate-based porous ceramic may have all the known additives for stabilizing the aluminum titanate phase. The expression "high-temperature stability" is understood to mean the capability of the aluminum-titanate-based material not to decompose into two phases, namely titanium oxide $TiO_2$ and aluminum oxide $Al_2O_3$, under the normal operating conditions of a particulate filter. Conventionally, this property is measured according to the invention by a stability test consisting in determining the phases present in the material, typically by X-ray diffraction, and then in subjecting it to a heat treatment at 1100° C. for ten hours and checking, using the same method of X-ray diffraction analysis and under the same conditions, for the appearance of alumina and titanium oxide phases at the detection threshold of the equipment.

In another possible embodiment according to the invention, the porous walls of the filter structure are made of an SiC-based material and a ceramic and/or glassy binding matrix, said glassy matrix possibly comprising $SiO_2$. The term "ceramic binding matrix" is understood to mean a continuous structure between the grains, typically with a mean size or diameter between and 100 microns and preferably between 10 and 100 microns, and obtained by firing or sintering so as to consolidate the material constituting said matrix. The expression "glassy matrix" is understood in particular to mean a matrix formed by a noncrystalline or slightly crystalline material comprising at least 30% silica ($SiO_2$).

In another possible embodiment according to the invention, the porous walls of the filter structure are made of an alumina-based material.

In another possible embodiment according to the invention, the porous walls of the filter structure are made of a cordierite-based material.

In one possible embodiment, the filter consists of an assembly of filtering monoliths, the cross section of a monolith constituting the assembled structure is preferably square, the width of the monolith being between 30 mm and 50 mm. The jointing material is understood here to mean a moldable composition formed by a particle and/or fiber blend, whether dry or wet, capable of setting and of having a sufficient mechanical strength at room temperature or after drying and/or heat treatment, the temperature of which will not exceed the softening or slumping temperature that defines the refractoriness of the material(s) constituting the monoliths. The jointing material preferably comprises particles and/or fibers of a ceramic or refractory material, chosen from non-oxides, such as SiC, aluminum and/or silicon nitride and aluminum oxynitride, or from oxides, especially comprising $Al_2O_3$, $SiO_2$, MgO, $TiO_2$, $ZrO_2$, $Cr_2O_3$ or any mixture thereof.

The filter, whether assembled or not, preferably has a coating cement fastened to the assembled filter, especially of the same mineral composition as the jointing material so as to reduce the thermomechanical stresses.

The filter structure obtained by the process according to the invention may furthermore include a supported, or preferably unsupported, active catalytic phase typically comprising at least one precious metal such as Pt and/or Rh and/or Pd and possibly an oxide such as $CeO_2$, $ZrO_2$ or $CeO_2$—$ZrO_2$.

The invention and its advantages will be better understood on reading the following nonlimiting examples provided solely for demonstrating the advantages associated with the use of the setter according to the invention. In the examples, all the percentages are given by weight.

EXAMPLES a) Production of a Powder Obtained from Fused-Cast Aluminum Titanate

In all the examples, the percentages are given by weight. In a preliminary step, aluminum titanate was prepared from the following raw materials:
- about 40% alumina by weight, with an $Al_2O_3$ purity level greater than 99.5% and a median diameter $d_{50}$ of 90 μm, sold under the reference AR75® by Pechiney;
- about 50% titanium oxide by weight, in rutile form, comprising more than 95% $TiO_2$ and about 1% zirconia and having a median diameter $d_{50}$ of about 120 μm, sold by Europe Minerals;
- about 5% silica by weight, with an $SiO_2$ purity level greater than 99.5% and a median diameter $d_{50}$ of around 210 μm, sold by SIFRACO; and
- about 4% by weight of a magnesia powder with an MgO purity level greater than 98%, more than 80% of the particles of which having a diameter between 0.25 and 1 mm, sold by Nedmag.

The initial blend of reactive oxides was melted in an electric arc furnace, in air, under oxidizing electrical operation. The molten blend was then cast into a CS mold so as to achieve rapid cooling. The product obtained was milled and screened in order to obtain powders of various particle size fractions. More precisely, the milling and screening operations were carried out under conditions for obtaining in the end the following two particle size fractions:
- one particle size fraction characterized by a median diameter $d_{50}$ substantially equal to 50 microns, denoted by the term "coarse" fraction according to the present invention; and
- one particle size fraction characterized by a median diameter $d_{50}$ substantially equal to 1.5 microns, denoted by the term "fine" fraction according to the present invention.

In the context of the present description, the median diameter $d_{50}$ denotes the particle diameter, measured by sedigraphy, below which 50% by volume of the population lies.

Microprobe analysis showed that all the grains of the fused phase thus obtained have the following composition, in percentages by weight of the oxides below (Table 1):

TABLE 1

| $Al_2O_3$ | $TiO_2$ | MgO | $SiO_2$ | CaO | $Na_2O$ | $K_2O$ | $Fe_2O_3$ | $ZrO_2$ | TOTAL |
|---|---|---|---|---|---|---|---|---|---|
| 40.5 | 48.5 | 3.98 | 4.81 | 0.17 | 0.15 | 0.47 | 0.55 | 0.85 | 100.00 | b) Manufacture of Green Monoliths

Firstly, a series of dry green monoliths was synthesized in the manner below:

Powders according to the following composition were blended in a mixer:
- 100% of a blend of two aluminum titanate powders produced beforehand by fuse casting, namely about 75% of a first powder with a median diameter of 50 μm and 25% of a second powder with a median diameter of 1.5 μm.

Next, the following were added, relative to the total mass of the blend:
- 4% by weight of an organic binder of the cellulose type;
- 15% by weight of a pore-forming agent;
- 5% of a plasticizer derived from ethylene glycol;
- 2% of a lubricant (oil);

0.1% of a surfactant; and about 20% of water so as to obtain, using the techniques of the prior art, a homogenous paste after mixing, the plasticity of which enabled a honeycomb structure to be extruded through a die, which structure, after being fired, had the dimensional characteristics as in Table 2.

Next, the green monoliths obtained were dried by microwave drying for a time sufficient to bring the chemically unbound water content to less than 1% by weight.

The channels of both ends of the monoliths were plugged using well-known techniques, for example those described in U.S. Pat. No. 4,557,773, with a mixture satisfying the following formulation:

100% of a blend of two aluminum titanate powders produced beforehand by fuse casting, namely about 66% of a first powder with a median diameter of 50 μm and 34% of a second powder with a median diameter of 1.5 μm;

1.5% of an organic binder of the cellulose type;

21.4% of a pore-forming agent;

0.8% of a dispersant based on a carboxylic acid; and about 55% of water so as to obtain a mixture capable of sealing the monoliths on every other channel.

The characteristics of the monoliths, after progressive firing in air until a temperature of 1450° C. was reached, which was maintained for 4 hours, are given in Table 2 below:

TABLE 2

| Example | 1 |
|---|---|
| Material | Essentially aluminum titanate phase |
| Characteristics of the structure after firing: | |
| monolith shape | cylindrical |
| cell cross section | square |
| length | 200 mm |
| diameter | 150 mm |
| wall thickness | 350 μm |
| Median pore diameter | 13 μm |
| Mercury porosity | 44% |
| Average shrinkage of the filter on being fired | 8% |

The porosity characteristics were measured by high-pressure mercury porosimetry analysis carried out using a Micromeritics 9500 porosimeter. The shrinkage was measured by the percentage ratio of the difference between the diameter (in mm) of the monolith after firing and that of the dry green monolith divided by the diameter (in mm) of the dry green monolith. The diameter was measured in the upper portion of the filter, i.e. close to the face opposite to that which is directly in contact with the firing setter, so as to ignore any "elephant foot" deformation at the base of the filter. The shrinkage value indicated in Table 2 corresponds to an average obtained from measurements made on a population of 10 monoliths.

Figure 2:
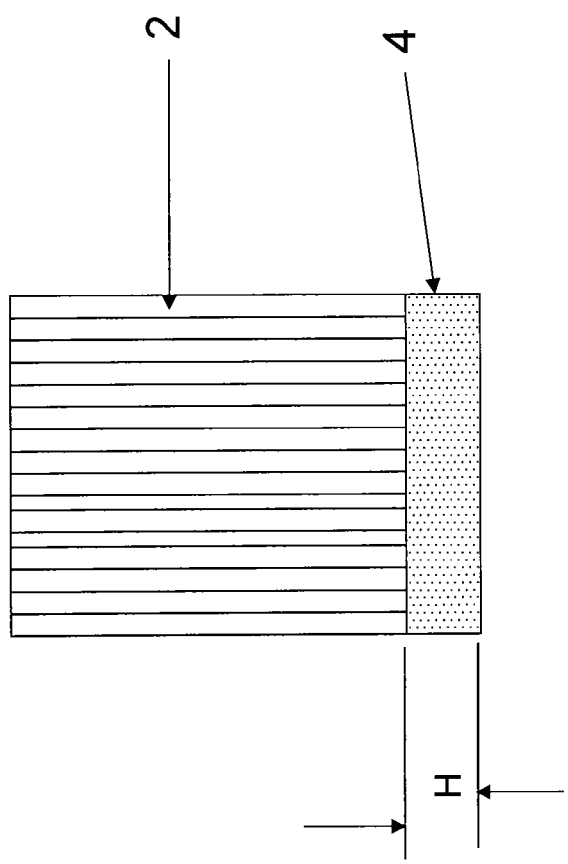
FIG. 2 shows the dimensional characteristics of the setter as in Example 1.

In the case of Example 1 (a comparative example), the monoliths were fired on a green honeycomb setter having the same structure and the same particle-size and mineralogical chemical composition as the monoliths. The dimensional characteristics of the setter, the general shape of which is illustrated in FIG. 2, are given in Table 3. According to this example, the firing setter also has a cylindrical shape and a diameter identical to that of the structure to be fired.

Figure 7:
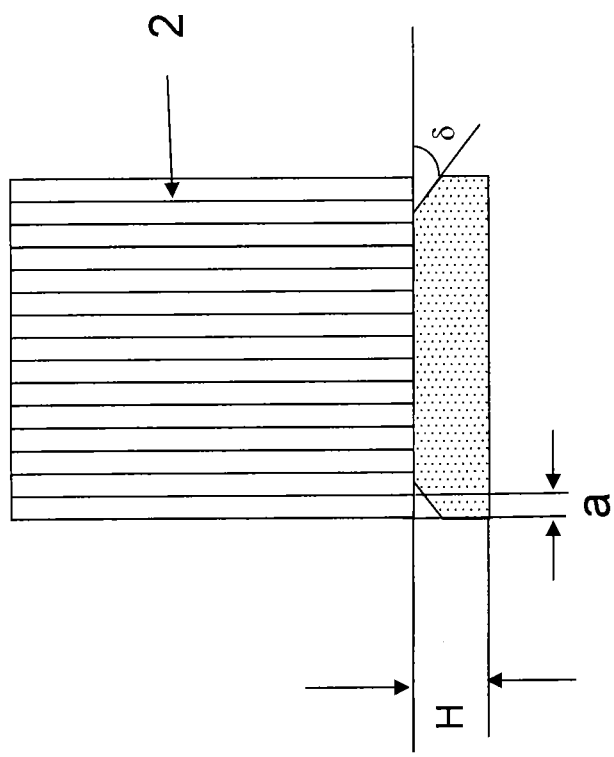
FIG. 7 shows a setter as in EP 0 234 887 and Example 2 (a comparative example).

Unlike the previous example, the monoliths obtained according to Example 2 (also comparative example) were fired on a setter having a geometry identical to that in FIG. 7 of patent EP 0 234 887. The dimensions of this setter are given in Table 3. Appended FIG. 7 shows schematically the shape of the setter, the length a and the angle δ characterizing the setter described in this prior art.

Unlike the above comparative examples, the monoliths of Examples 3, 4 and 5 according to the invention were fired on a green honeycomb setter having the shape illustrated in FIG. 5, the dimensions of said setter being given in Table 3 below. The setter consisted this time of two circular levels of respective diameter $L_1$ (1st level) and $L_2$ (2nd level), the diameter $L_2$ being, in accordance with the invention, smaller than the diameter $L_1$.

TABLE 3

| Example | 1 | 2 | 3 | 4 | 5 |
|---|---|---|---|---|---|
| Setter | As in FIG. 2 | As in FIG. 7 (EP234887) | As in FIG. 5 | As in FIG. 5 | As in FIG. 5 |
| $L_s$ (mm) | 163 | 163 | 163 | 163 | 163 |
| $L_1$ (mm) | 163 | 163 | 163 | 163 | 163 |
| $L_2$ (mm) | 163 | 163 | 130 | 140 | 140 |
| $E_{1-2}$ (mm) | — | — | 40 | 40 | 28 |
| H (mm) | 40 | 40 | 40 | 40 | 28 |
| a (mm) | 0 | 10 | — | — | — |
| δ (°) | 0 | 30 | — | — | — |
| α (°) | 0 | 0 | 68 | 74 | 68 |
| Horizontal deformation (%) | >2.5 | <1.5 | 1.2 | 1.6 | 1.8 |
| Vertical deformation (%) | <0.1 | >1 | <0.1 | <0.1 | <0.1 |

The width $L_S$ was measured on the structure in the dry green state at the base of the monolith. The dimensions $L_1$, $L_2$, $L_3$, $E_{1-2}$, $E_{2-3}$, a and H and the angles α and δ were measured on the dry green setter.

The horizontal ("elephant foot") deformation, that is to say deformation parallel to the plane formed by the surface of the setter in contact with the part to be fired, was measured on each monolithic filter after firing. The percentage deformation expressed in Table 3 is an average percentage measured on a sample of 10 filters. It was determined by measuring the difference in the outside diameter at the top and at the base of the filter in contact with the firing setter and by dividing this difference by the average diameter of the filter and by multiplying by 100. A horizontal deformation greater than 2% is considered as unsatisfactory for the application.

The vertical deformation was measured on a filter or monolith after firing by the difference in length of the filter at the center and at the periphery of the filter, dividing this by the length at the center of the filter and multiplying by 100. A vertical deformation greater than 0.1% necessitates an additional machining operation carried out on the part obtained and is, for this reason, considered to be unsatisfactory.

The results presented in Table 3 thus show that the setters according to the invention make it possible to obtain a filter having the smallest deformations both in the horizontal plane and in the vertical plane. In particular, the use of the setter according to the invention results in structures for which no adjustment, cutting or machining after firing appears to be necessary. Furthermore, in the case of a filter structure, the plugs may be fitted without any drawback before the step of firing the structure. This makes it possible for the homogeneity and the strength of the filters obtained to be significantly improved, especially for use as a particulate filter in an exhaust line of a motor vehicle.

The invention claimed is:

1. A process for firing a honeycomb porous ceramic structure, the process comprising:

contacting the honeycomb porous ceramic structure with a first face of a firing setter thereby firing the structure, wherein the structure comprises a plurality of longitudinal through-channels terminating in two ends of the structure, wherein a first end of the two ends of the structure bearing on the setter has a maximum width $L_S$ before firing, in a longitudinal sectional plane passing through a principal axis of the structure, wherein the setter comprises, in the longitudinal sectional plane:

a first level corresponding to the first face of the setter serving as bearing surface for the structure to be fired, wherein the first level has a maximum width $L_1$; and a second level, spaced away from the first face of the setter by a thickness $E_{1-2}$, wherein the second level has a maximum width $L_2$, wherein the width $L_1$ is equal to or greater than $L_S$; and wherein the width $L_2$ is less than $L_1$.

2. The process of claim 1, wherein the width $L_1$ is between $L_S$ and $1.1 \times L_S$.

3. The process of claim 2, wherein a relative difference $(L_1-L_2)/L_1$ between the two widths $L_1$ and $L_2$ is equal to or greater than about 5%.

4. The process of claim 2, wherein the first end of the structure and the face of the setter serving as bearing face thereof have substantially the same shape, or substantially the same geometry, or substantially the same shape and geometry.

5. The process of claim 2, wherein the setter is a honeycomb setter and comprises a plurality of longitudinal through-channels opening onto two ends, an upper end of the setter constituting the first level.

6. The process of claim 1, wherein a relative difference $(L_1-L_2)/L_1$ between the two widths $L_1$ and $L_2$ is equal to or greater than about 5%.

7. The process of claim 6, wherein the first end of the structure and the face of the setter serving as bearing face thereof have substantially the same shape, or substantially the same geometry, or substantially the same shape and geometry.

8. The process of claim 1, wherein the first end of the structure and the face of the setter serving as bearing face thereof have substantially the same shape, or substantially the same geometry, or substantially the same shape and geometry.

9. The process of claim 1, wherein the setter is a honeycomb setter and comprises a plurality of longitudinal through-channels opening onto two ends, an upper end of the setter constituting the first level.

10. The process of claim 1, wherein a thermal expansion of a material comprised in the setter varies by at most 2% of a thermal expansion of the material comprised in the structure within a temperature range of the firing.

11. The process of claim 1, wherein a shrinkage on firing a material comprised in the setter varies by at most 2% of a shrinkage on firing a material comprised in the structure within a temperature range of the firing.

12. The process of claim 1, wherein the setter has a trapezoidal shape, wherein the second level corresponds to a second face of the setter.

13. The process of claim 1, wherein the setter has a third level corresponding to a second face of the setter, having a width $L_3$, wherein the width $L_3$ is equal to or greater than the width $L_2$ and at least equal to $\frac{3}{5}$ of the width $L_S$.

14. The process of claim 1, wherein a honeycomb filter structure is obtained, in which longitudinal through-channels of the structure are alternately blocked before contacting the honeycomb porous ceramic structure with the first face of the firing setter at ends of the channels.

15. The process of claim 1, wherein the firing setter has a third level corresponding to a second face of the setter, having a width $L_3$, wherein the width $L_3$ is equal to or greater than the width $L_2$.

* * * * *